United States Patent [19]
Williamson

[11] Patent Number: 5,330,809
[45] Date of Patent: * Jul. 19, 1994

[54] THERMAL PROTECTION SLEEVE FOR REDUCING OVERHEATING OF WIRE BUNDLES UTILIZED IN AIRCRAFT APPLICATION

[75] Inventor: Mickey A. Williamson, Seattle, Wash.

[73] Assignee: The Boeing Company, Seattle, Wash.

[*] Notice: The portion of the term of this patent subsequent to Dec. 12, 2007 has been disclaimed.

[21] Appl. No.: 638,475

[22] Filed: Dec. 12, 1990

Related U.S. Application Data

[62] Division of Ser. No. 355,619, May 23, 1989, abandoned.

[51] Int. Cl.⁵ .............................................. B29D 22/00
[52] U.S. Cl. ................................. 428/36.2; 428/36.5; 428/36.91; 428/365; 428/391; 174/113 R; 174/121 A; 174/121 SR; 174/122 G; 174/122 C; 174/120 SR; 174/110 S; 174/110 F; 174/137 B

[58] Field of Search ................... 428/312.6, 319.1, 222, 428/318.4, 188, 304.4, 380, 384, 377, 379, 36.2, 36.5, 36.91, 365, 391; 174/113 R, 121 A, 121 SR, 122 G, 122 C, 120 SR, 110 S, 110 F

[56] References Cited

U.S. PATENT DOCUMENTS

| | | | |
|---|---|---|---|
| 2,079,943 | 5/1937 | Lobdell | 428/384 |
| 2,514,170 | 7/1950 | Walter et al. | 428/251 |
| 2,854,352 | 9/1958 | Gronemeyer | 117/44 |
| 2,882,183 | 4/1959 | Bond et al. | 117/68.5 |
| 4,822,659 | 4/1989 | Anderson et al. | 428/99 |

*Primary Examiner*—George F. Lesmes
*Assistant Examiner*—Chris Raimund
*Attorney, Agent, or Firm*—Conrad Gardner; Bernard A. Donahue

[57] ABSTRACT

An electrical cable having a wire bundle core surrounded by a thermal protection sleeve, the thermal protection sleeve consisting of a sandwich structure of outer acrylic adhesive layer and a silicone foam core.

1 Claim, 1 Drawing Sheet

THERMAL PROTECTION SLEEVE FOR REDUCING OVERHEATING OF WIRE BUNDLES UTILIZED IN AIRCRAFT APPLICATION

RELATED PATENT APPLICATION

This patent application is a divisional application of the U.S. patent application Ser. No. 07/355,619, filed May 23, 1989 (now abandoned).

FIELD OF THE INVENTION

The present invention relates to protection of wire bundles utilized in aircraft applications, and more particularly, to thermal and chafe guard protection for wire bundles.

BACKGROUND OF THE INVENTION

The operation of an integrity of insulated conductors forming a core or wire bundle in an aircraft environment must be maintained otherwise a resulting transmission of erroneous data through the wire bundles may occur.

In a severe environment of increased temperatures such as inside the leading edge of a wing, a thermal barrier installed over the wire bundles can afford the protection needed.

SUMMARY OF THE INVENTION

Thermal protection for conductors is well known and exemplified for example in U.S. Pat. Nos. 2,641,561; 3,516,951; 3,772,239; 3,874,980; 4,388,366; and 4,686,141.

It is accordingly an object of the present invention to provide a flexible, thermal shape setting, thermal and chafe guard protection sleeve which includes a sandwich structure having a silicone form core.

It is a further object of the present invention to provide a thermal protection sleeve for wire bundles which includes a silicone foam core with outer acrylic adhesive layers having a setup temperature which provides whatever shape the sleeve must take after installation over the wire bundles thereby eliminating the need for any mechanical fasteners resulting in reduced weight and installation costs.

BRIEF DESCRIPTION OF THE DRAWINGS

The invention will be better understood by the following description and reference to the accompanying drawing wherein.

DESCRIPTION OF THE PREFERRED EMBODIMENT

Figure 1:
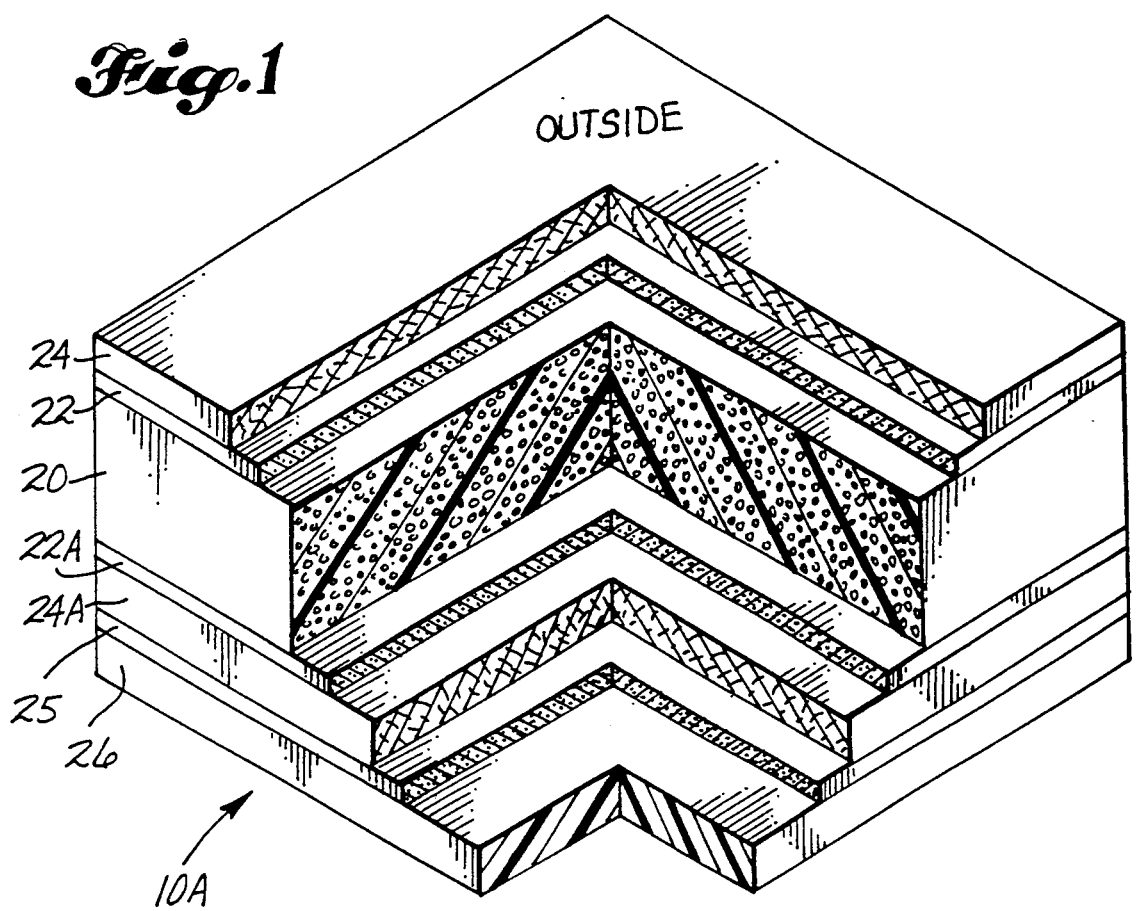
FIG. 1 is a cross-sectional view taken in perspective of the present insulative sleeve; and, FIG. 2 is a cross section of the wire bundle and sleeve from which the section of FIG. 1 was taken.
Figure 2:
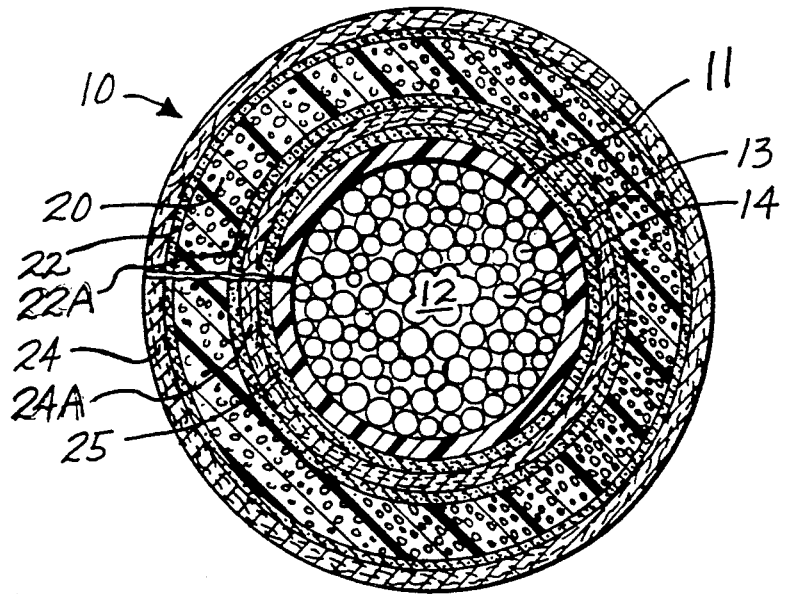

Turning now to FIGS. 1 and 2, it can be seen that a thermal protection sleeve 10 surrounds a wire bundle core 12 (see FIG. 2), which wire bundle core 12 is made up of a plurality of insulated conductors e.g. 13, 14. Turning now to FIG. 1, it should be noted that the thermal protection sleeve 10A comprises a sandwich structure having a laminate of silicone foam 20 provided on both sides with an acrylic adhesive adhered layer of fiber glass 24 and 24A. Acrylic adhesive 22 and 22A for attaching fiber glass layers 24 and 24A to silicone foam laminate 20 may comprise e.g. Polyad 130 which is an acrylic adhesive manufactured by H & N Chemicals of Totowa, N.J. 07512.

Fiber glass layers 24 and 24A may comprise type CHR 1606 fiber glass made by CHR Industries, Inc. of New Haven, Conn. 06509.

An outer layer 25 of acrylic adhesive is utilized to set thermal protection sleeve 10 about core 12 of the wire bundle core including insulated electrical conductors 13 and 14. Acrylic adhesive layer 25 may comprise the same material as acrylic adhesive layers 22 and 22A while silicone release liner 26 protects the adhesive coating prior to application the fiber glass liner 24A, acrylic adhesive layers 22A and 25, and silicone release liner 26.

When desired the present sandwich structure comprising thermal protection sleeve 10 may be made fuel resistant by applying a fluorosilicone coating on the outside surface of outer layer 24, such fuel resistant coating may comprise 3M Scotch Weld Fuel Tank Coating type P/N EC-2600 made by Adhesives Coatings and Sealers Division/3M, 3M Center, St. Paul Minn. 55101, a division of 3M.

What is claimed is:

1. An electrical cable having a wire bundle core surrounded by a thermal protection sleeve, said thermal protection sleeve comprising a lamination of silicone foam and an acrylic adhered layer of fiber glass provided on both sides of said silicone foam.

* * * * *